United States Patent Office 2,939,873

Patented June 7, 1960

2,939,873

SYNTHESIS OF STEROID PHOSPHATES

John M. Chemerda, Metuchen, and Roger J. Tull, Plainfield, N.J., and James F. Fisher, State College, Pa., assignors to Merck & Co., Inc., Rahway, N.J., a corporation of New Jersey No Drawing. Filed Jan. 26, 1959, Ser. No. 788,707

6 Claims. (Cl. 260—397.45)

This invention relates to processes for producing steroid phosphates having anti-inflammatory activity, and more particularly to processes for producing 21-phosphate tertiary lower alkyl amine salts of 21-hydroxy steroids of the pregnane series.

According to the present invention a 21-halo compound or a 21-lower hydrocarbon sulfonate corresponding to the desired 21-phosphate tertiary lower alkyl amine salt is reacted with a tertiary lower alkyl amine phosphate (or its equivalent, a combination of phosphoric acid and a tertiary lower alkyl amine) in an alkaline organic solvent medium.

The process of the present invention is especially useful in the synthesis of 21-phosphate tertiary lower alkyl amine salts of 3,20-dioxo-17α,21-dihydroxy-11-oxygenated steroids of the 4-pregnene and 1,4-pregnadiene series, where the 11-oxygenated function is β-hydroxyl or oxo. These compounds have a general formula of the group consisting of

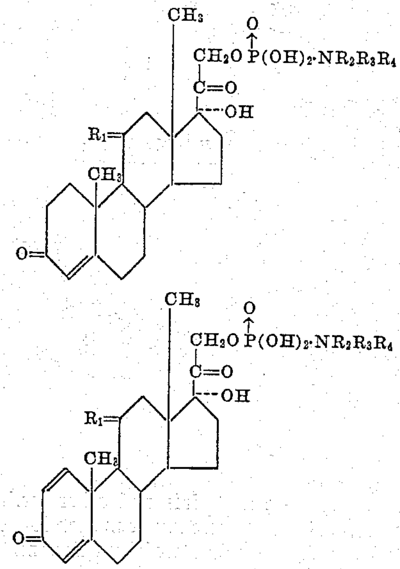

and the therapeutically active nuclear substituted derivatives thereof. In the above formulas $R_1$ is selected from the group consisting of β-hydroxyl $$\left(\begin{array}{c}HO\\ \rangle \\ H\end{array}\right)$$

and oxo (O=), and $R_2$, $R_3$, and $R_4$ are lower alkyl radicals. "Therapeutically-active nuclear substituted derivatives" refers to compounds which conform to either of the above formulas except for the presence of one or more substituent groups not indicated in the formulas, and which have anti-inflammatory activity. Among the substituent groups which may be present are 2α-methyl, 9α-fluoro, 16α-hydroxy, and 16α-methyl.

The steroid phosphate tertiary amine salts described in the preceding paragraph are water-soluble, stable crystalline compounds. Unlike the steroid phosphate free acids and the amorphous alkali metal salts, the tertiary amine salts are easily characterized. These tertiary amine salts are valuable because of their high degree of anti-inflammatory activity and low incidence of side reactions. As a result of their water solubility and absence of irritation to the eye, these salts are superior to previously known products as anti-inflammatory active ingredients in ophthalmic solutions. They are also superior in ointments for topical application. The amine salts are also useful as intermediates in the preparation of the corresponding steroid dihydrogen phosphates and alkali metal salts in pure form.

Among the therapeutically active 21-phosphate tertiary lower alkyl amine salts which can be prepared by the process of this invention are prednisolone 21-phosphate triethylamine salt,
prednisolone 21-phosphate trimethylamine salt,
prednisone 21-phosphate triethylamine salt,
hydrocortisone 21-phosphate triethylamine salt,
cortisone 21-phosphate triethylamine salt,
9α-fluoro-prednisolone 21-phosphate triethylamine salt,
9α-fluoro-16α-methylprednisolone 21-phosphate triethylamine salt, and other tri-lower alkyl amine salts, such as trimethylamine salts, triisopropylamine salts, tributylamine salts, and triisoamylamine salts, corresponding to the above triethylamine salts.

Besides the therapeutically active steroid 21-phosphate tertiary lower alkyl amine salts above described, other steroid 21-phosphate tertiary lower alkyl amine salts which are useful as intermediates in the manufacture of therapeutically active compounds can also be prepared. These intermediates include compounds having a saturated A-ring, e.g., 11β,17α,21-trihydroxy-3,20-pregnanedione 21-phosphate triethylamine salt, 11β,17α,21-trihydroxy-16β-methyl-3,20-pregnanedione 21-phosphate triethylamine salt, and 9α-fluoro-11β,17α,21-trihydroxy-3,20-pregnanedione 21-phosphate triethylamine salt, which are convertible to the corresponding therapeutically active 4-pregnene and 1,4-pregnadiene series compounds by bromination at the 4 or 2 and 4 positions followed by dehydrobromination.

The steroid starting material is a 21-halo compound, in which the halogen has an atomic weight of at least 35, i.e., a 21-iodo-, 21-bromo-, or 21-chloro compound, or a 21-lower hydrocarbon sulfonate in which the hydrocarbon sulfonate radical has from one to about 10 carbon atoms, e.g. a 21-methanesulfonate or a 21-p-toluenesulfonate, corresponding to the desired product. The starting materials for making the preferred therapeutically active tertiary amine phosphates are compounds having a general formula of the group consisting of

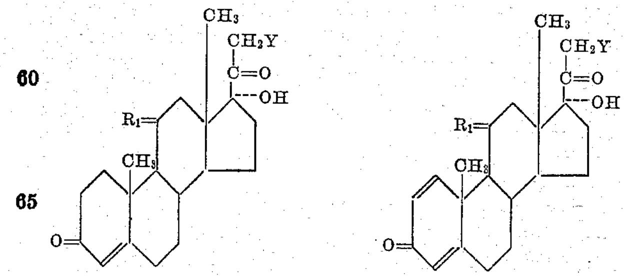

and the therapeutically active nuclear substituted derivative thereof, where $R_1$ is as previously defined and Y is a radical of the group consisting of halogens having an atomic weight of at least 35 and lower hydrocarbon sulfonyloxy radicals having the general formula $—OSO_2R_5$ where $R_5$ is a hydrocarbon radical containing from one to 10 carbon atoms.

Typical starting compounds include

11β,17α-dihydroxy-21-iodo-4-pregnene-3,20-dione,
21-bromo-11β,17α-dihydroxy-4-pregnene-3,20-dione,
21-chloro-11β,17α-dihydroxy-4-pregnene-3,20-dione,
11β,17α,21-dihydroxy-4-pregnene-3,20-dione 21-methanesulfonate,
11β,17α,21-trihydroxy-4-pregnene-3,20-dione 21-p-toluenesulfonate,
17α-hydroxy-21-iodo-4-pregnene-3,11,20-trione,
11β,17α-dihydroxy-21-iodo-1,4-pregnadiene-3,20-dione,
21-chloro-11β,17α-dihydroxy-1,4-pregnadiene-3,20-dione,
11β,17α,21-trihydroxy-1,4-pregnadiene-3,20-dione 21-methanesulfonate,
11β,17α,21-trihydroxy-1,4-pregnadiene-3,20-dione 21-p-toluenesulfonate,
17α-hydroxy-21-iodo-1,4-pregnadiene-3,11,20-trione,
9α-fluoro-11β,17α-dihydroxy-21-iodo-4-pregnene-3,20-dione,
9α-fluoro-17α-hydroxy-21-iodo-4-pregnene-3,11,20-trione,
9α-fluoro-11β,17α-dihydroxy-21-iodo-1,4-pregnadiene-3,20-dione,
9α-fluoro-17α-hydroxy-21-iodo-1,4-pregnadiene-3,11,20-trione,
9α-fluoro-11β,16α,17α-trihydroxy-21-iodo-1,4-pregnadiene-3,20-dione,
11β,17α-dihydroxy-21-iodo-2α-methyl-4-pregnene-3,20-dione,
11β,17α-dihydroxy-21-iodo-16α-methyl-4-pregnene-3,20-dione,
17α-hydroxy-21-iodo-16α-methyl-4-pregnene-3,11,20-trione,
11β,17α-dihydroxy-16α-methyl-21-iodo-1,4-pregnadiene-3,20-dione,
17α-hydroxy-21-iodo-16α-methyl-1,4-pregnadiene-3,11,20-trione,
9α-fluoro-11β,17α-dihydroxy-21-iodo-16α-methyl-1,4-pregnadiene-3,20-dione,
11β,17α-dihydroxy-21-iodo-3,20-pregnanedione,
11β,17α-dihydroxy-21-iodo-16α-methyl-3,20-pregnanedione, and 9α-fluoro-11β,17α-dihydroxy-21-iodo-16α-methyl-3,20-pregnanedione. Other starting steroid materials will also be evident.

Phosphoric acid and a tertiary lower alkyl amine are the other reagents in the process of this invention. The phosphoric acid reagent may be of commercial concentration, e.g. 85% or 100%, or of somewhat lower concentration.

The amine reagent is a tertiary lower alkyl amine such as trimethylamine, triethylamine, tributylamine, diethyl isopropylamine, methyl ethyl isopropylamine, triisoamylamine, and the like. The general formula of the amine reagent is $R_2R_3R_4N$, where $R_2$, $R_3$, and $R_4$ are lower alkyl radicals as previously indicated.

The reaction is carried out in an organic solvent, preferably one in which the steroid phosphate tertiary amine salt product is insoluble and the other reaction products and reagents are soluble. This makes it easy to recover the product by conventional means. Acetonitrile has been found to be an excellent solvent fulfilling these qualifications. Other solvents which may be used include the lower aliphatic alcohols such as methanol and tertiary butyl alcohol.

Both the phosphoric acid and the amine reagent are present in excess based on the quantity of steroid. This excess may range from slight to substantial. For example, the amount of phosphoric acid may be as much as ten times stoichiometric quantity. The mole ratio of amine to phosphoric acid is preferably about 2:1, but may be varied as long as an alkaline reaction medium is maintained. By "alkaline" is meant a reaction medium which is alkaline to conventional indicators when diluted with water. Since both amine and phosphoric acid are present, the reaction is in effect between the steroid starting material and an amine phosphate salt. In fact, the amine can be neutralized with phosphoric acid prior to contact with the steroid starting material, and the resulting salt, which in the preferred embodiment is the diamine phosphate, reacted with the steroid reagent.

A small amount of silver phosphate may be present in the reaction medium, although it is not essential. Silver phosphate appears to catalyze the reaction.

The reaction temperature is not critical, although, in general, elevated temperatures are preferred. The reaction proceeds readily at reflux temperature. The reaction time likewise is not critical and may vary from about one hour to ten hours or more. The reaction time is of course dependent on temperature, the lower temperatures necessitating longer reaction times.

The steroid phosphate amine salt product may be precipitated by concentration of the organic solvent, followed by cooling of the concentrate to about room temperature or lower. The product may then be recovered by conventional means such as filtration. The other constituents of the reaction mixture remain in solution, so that separation of a product of high purity is effected.

For the purpose of specific illustration the product of prednisolone-21-dihydrogen phosphate triethylamine salt is given below. In the preferred mode of operation 11β,17α-dihydroxy-21-iodo-1,4-pregnadiene-3,20-dione is reacted with excess triethylamine and phosphoric acid, the molar ratio of the latter two being about 2:1, according to the following equation:

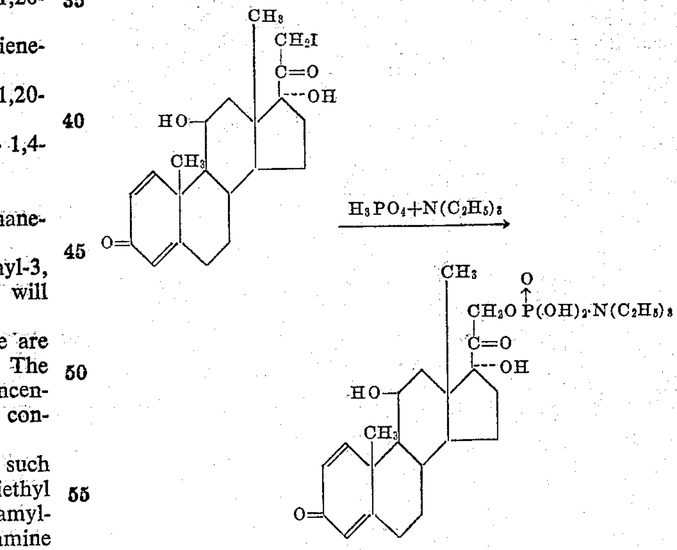

Other steroid starting materials and other tertiary lower alkyl amines, which have already been mentioned, may be substituted for the specific steroid starting material and amine in this illustration.

The steroid phosphate amine salts prepared according to this invention are also easily converted to the corresponding steroid dihydrogen phosphate free acids and alkali metal salts thereof. The conversion to the dihydrogen phosphate is most readily effected by contact of a solution of the steroid phosphate amine salt in a suitable solvent such as methanol, with a strongly acidic anion exchange resin in its hydrogen form. Among the suitable anion exchange resins are polystyrene resins cross-linked with divinyl benzene having the exchangeable hydrogen atoms in the form of sulfonic acid groups. An example of such a resin is "Amberlite IR-120" made by Rohm and Haas Company, Philadelphia. The resulting steroid dihydrogen phosphate, which is a 21-dihydrogen phosphate ester of a 4-pregnene compound such as cortisone or hydrocortisone or a 1,4-pregnadiene such as prednisone or prednisolone, is a water-soluble compound suitable for ophthalmic preparations or in solutions for either oral or intravenous administration where rapid response is required.

This invention will now be further described with reference to specific embodiments thereof.

*Example 1*

A solution of 102 cc. of triethylamine and 24 cc. of phosphoric acid in 144 cc. of acetonitrile was poured into a suspension of 48 g. of 11β,17α-dihydroxy-21-iodo-1,4-pregnadiene 3,20-dione and 6 g. of silver phosphate in 360 cc. of acetonitrile. The mixture was boiled at reflux for about one and one-half hours with a clear solution resulting after about 20 minutes. The solution was filtered hot to remove trace insolubles and the filtrate concentrated under reduced pressure at a bath temperature of 50° C. to a volume of 120 cc. The concentrate was aged for 16 hours at 25° C. and the resulting slurry was diluted with 120 cc. of acetonitrile, aged at 0° to 5° C. for one hour and filtered. The filter cake of 11β,17α,21-trihydroxy-1,4-pregnadiene-3,20-dione 21-phosphate triethylamine salt (prednisolone 21-phosphate triethylamine salt) was washed with acetonitrile and ether and dried in air at 25° C. Yield 33.7 to 34.8 g. (61% to 63%); dec. 201° C.; E% 268 at 2,470 A. Analysis showed the triethylamine content to be 19.2% (theoretical: 18.7%). Electrophoresis showed a single spot.

A solution of 20 g. of 11β,17α,21-trihydroxy-1,4-pregnadiene-3,20-dione 21-hydrogen phosphate triethylamine salt was dissolved in 100 cc. of methanol, and the solution passed over an anion exchange resin column containing 38.4 cc. of "Amberlite IR-120" resin in its hydrogen form over a period of one and one-half hours. The column was eluted with 200 cc. of methanol. The eluate showed a constant slight spot with an utraviolet scanner when elution was complete. The eluate was neutralized by the addition of a solution of 1.6 g. of sodium hydroxide in 160 cc. of methanol. The neutralized solution had a pH of 5.7 as determined by pH indicator paper, or about 6.7 for a 50% aqueous methanol solution as determined by a pH meter. The neutralized solution was concentrated under reduced pressure at a temperature below 35° C. to a volume of 140 cc. A precipitate of 17β,21-dihydroxy-4-pregnene-3,11,20-trione 21-phosphate monosodium salt was obtained by the slow addition of 600 cc. of absolute ether at 25° C. The product was filtered and washed with ether and dried in air at 25° C. Yield 17.2 to 17.6 g. (95% to 97%); moisture (Karl Fischer's method) 5.5%; E% 312 to 314 at 2,470 A. Analysis revealed a trace (0.18%) of triethylamine. Electrophoresis showed a single spot.

*Example 2*

The procedure of Example 1 was repeated except that the silver phosphate was omitted. The same product was obtained as in Example 1.

*Example 3*

To a slurry of 3.72 g. of 11β,17α,21-trihydroxy-1,4-pregnadiene-3,20-dione 21-methanesulfonate in 30 cc. of acetonitrile was added a solution of 8.5 cc. of triethylamine and 2 cc. of 85% phosphoric acid in 12 cc. of acetonitrile. The mixture was boiled under reflux for three hours, concentrated under reduced pressure to about 10 cc., diluted with about 50 cc. of absolute ethanol, reconcentrated to about 10 cc., and allowed to stand until crystallization was complete. The mixture was diluted with 8 cc. of acetonitrile, filtered, and the product, 11β,17α,21-trihydroxy-1,4-pregnadiene-3,20-dione 21-phosphate triethylamine salt, washed with ether. Yield 1.7 g. (37%); M.P. 200°-201.5° C.—E% 269 at 2,470 A.

*Example 4*

To a slurry of 4 g. of 11β,17α-dihydroxy-21-iodo-4-pregnene-3,20-dione, 6.4 g. of silver phosphate and 3.2 g. of diatomaceous earth filter aid and 30 cc. of acetonitrile was added a solution of 8.4 cc. of triethylamine and 2 cc. of 85% phosphoric acid in 12 cc. of acetonitrile. The mixture was heated at 50° to 55° C. for seven hours, filtered, and the filtrate concentrated under reduced pressure to about 10 cc. The residue was diluted with ca. 50 cc. of absolute ethanol, reconcentrated to about 10 cc., and allowed to stand until crystallization was complete. The mixture was diluted with 8 cc. of acetonitrile, cooled, and washed with ether. The product obtained was 11β,17α,21-trihydroxy-4-pregnane-3,20-dione 21-phosphate triethylamine salt. Yield, 1.94 g. (42.4%); M.P. 183°-187°; E% 298 at 2,470 A.

*Example 5*

To a slurry of 4 g. of 11β,17α-dihydroxy-21-iodo-4-pregnene-3,20-dione, 6.4 g. of silver phosphate, and 3.2 g. of diatomaceous earth filter aid in 30 ml. of tertiary butyl alcohol was added a slurry of 8.5 ml. of triethylamine and 2.0 ml. of 85% phosphoric acid in 22 ml. of tertiary butyl alcohol. The mixture was boiled under reflux for three hours, filtered, and the filtrate concentrated under reduced pressure to about 10 ml. The residue was diluted with ca. 50 cc. of absolute ethanol, reconcentrated to about 10 cc., and allowed to stand until crystallization was complete. The mixture was diluted with 7 ml. of acetonitrile and the product was washed with ether. Electrophoresis of the product gave one spot having the same mobility as a known sample of 11β,17α,21-trihydroxy-4-pregnene-3,20-dione 21-phosphate triethylamine salt. M.P. 175°-180° C.; E% 298 at 2,480 A.

*Example 6*

To a slurry of 4.0 g. of 11β,17α-dihydroxy-21-iodo-4-pregnene-3,20-dione and 0.5 g. of silver phosphate and 22 ml. of acetonitrile was added a mixture of 14.36 ml. of tri-N-butylamine, 2.2 ml. of 85% phosphoric acid and 20 ml. of acetonitrile. The mixture was boiled under reflux for three hours, filtered, and the filtrate concentrated under reduced pressure to a small volume. The residue was triturated with absolute ethanol and filtered. The filtrate was concentrated under reduced pressure. The residue was identified as 11β,17α,21-trihydroxy-1,4-pregnadiene-3,20-dione 21-phosphate tri-N-butylamine salt by electrophoresis.

*Example 7*

To a slurry of 4.0 of 17α-hydroxy-21-iodo-4-pregnene 3,11,20-trione and 0.5 g. of silver phosphate and 30 ml. of acetonitrile was added a solution of 8.5 ml. of triethylamine and 2.0 ml. of 85% phosphoric acid in 12 ml. of acetonitrile. The mixture was boiled under reflux for three hours, filtered, and the filtrate concentrated under reduced pressure to a small volume. The residue was triturated with methanol and filtered. The filtrate was concentrated under reduced pressure to a small volume. The residue was identified as 17α,21-dihydroxy-4-pregnene-3,11,20-dione 21-phosphate triethylamine salt by electrophoresis.

*Example 8*

To a slurry of 1.6 g. of 21-chloro-11β,17α-dihydroxy-1,4-pregnadiene-3,20-dione, 3.2 g. of silver phosphate, and 1.6 g. of diatomaceous earth filter aid in 11 ml. of acetonitrile was added a solution of 4.3 ml. of triethylamine and 1.0 ml. of 85% phosphoric acid in 10 ml. of acetonitrile. The mixture was boiled under reflux for six hours, filtered, and the filtrate concentrated under reduced pressure to about 5 ml. The resulting slurry was diluted with 5 ml. of acetonitrile and allowed to stand until crystallization was complete. The mixture was filtered and the product washed with acetonitrile and ether. The product was 11β,17α,21-trihydroxy-1,4-pregnadiene-3,20-dione 21-phosphate triethylamine salt. Yield 0.73 g. (31.7%); M.P. 199°–201° C.; E% 279 at 2,470 A.

*Example 9*

To a slurry of 4 g. of 11β,17α-dihydroxy-21-iodo-4-pregnene-3,20-dione and 3.2 g. of diatomaceous earth filter aid and 30 cc. of acetonitrile was added a solution of 8.4 cc. of triethylamine and 2 cc. of 85% phosphoric acid in 12 cc. of acetonitrile. The mixture was heated at reflux for six hours, filtered, and the filtrate concentrated under reduced pressure to about 10 cc. The residue was flushed with absolute ethanol and allowed to stand until crystallization was complete. The mixture was diluted with 8 cc. of acetonitrile, cooled, and the product washed with ether. The resulting product was 11β,17α,-21-trihydroxy-4-pregnene-3,20-dione 21-phosphate triethylamine salt. Yield 1.33 g. (29%); M.P. 184°–188° C.

*Example 10*

To a slurry of 2.33 g. of 11β,17α,21-trihydroxy-4-pregnene-3,20-dione 21-p-toluenesulfonate in 12 cc. of acetonitrile was added a solution of 4.2 cc. of triethylamine and 1 cc. of 85% phosphoric acid in 10 cc. of acetonitrile. The solution that resulted was allowed to stand at room temperature for six hours, boiled under reflux for one hour and concentrated to a syrup under reduced pressure. The syrup was allowed to stand for six days, during which time 11β,17α,21-trihydroxy-4-pregnene-3,20-dione-21-hydrogen phosphate triethylamine salt crystallized. The slurry was diluted with 3.5 cc. of acetonitrile, allowed to stand 24 hours at room temperature, cooled at 0° to 5° C. for one hour, filtered, and the product washed with ether. Yield, 0.58 g. (25%).

*Example 11*

The process of Example 1 is carried out using 17α-hydroxy-21-iodo-1,4-pregnadiene-3,11,20-dione as the starting material. The product obtained is 17α,21-dihydroxy-1,4-pregnadiene-3,11,20-trione 21-phosphate triethylamine salt.

*Example 12*

The process of Example 5 is carried out using 17α-hydroxy-21-iodo-4-pregnene-3,11,20-trione as the starting material. The product 17α,21-dihydroxy-4-pregnene-3,11,20-trione 21-phosphate triethylamine salt is obtained.

*Example 13*

The process of example 7 is carried out using 9α-fluoro-11β,17α-dihydroxy-21-iodo-4-pregnene-3,20-dione as the starting material. A residue of 9α-fluoro-11β,17α,21-trihydroxy-4-pregnene-3,20-dione 21-phosphate triethylamine salt is obtained.

*Example 14*

The process of Example 9 is carried out with 11β,17α-dihydroxy-21-iodo-2α-methyl-4-pregnene-3,20-dione as the starting material. The product is 11β,17α,21-trihydroxy-2α-methyl-4-pregnene-3,20-dione 21-phosphate triethylamine salt.

*Example 15*

The process of Example 3 is carried out using 9α-fluoro-11β,16α,17α,21-tetrahydroxy-1,4-pregnadiene-3,20-dione 21-methanesulfonate as the starting material. The product 9α-fluoro-11β,16α,17α,21-tetrahydroxy-1,4-pregnadiene-3,20-dione 21-phosphate triethylamine salt is obtained.

*Example 16*

The process of Example 7 is carried out using 17α-hydroxy-21-iodo-16α-methyl-4-pregnene-3,11,20-trione as the starting material. The product 17,21-dihydroxy-16α-methyl-4-pregnene-3,11,20-trione 21-phosphate triethylamine salt is obtained.

*Example 17*

A solution of bis-triethylamine phosphate was prepared by slowly adding 2.36 ml. of 85% phosphoric acid to 20 ml. of acetonitrile containing 9.9 ml. of triethylamine at 20° C. This solution was added to a stirred mixture of 4.70 g. of 9α-fluoro-11β,17α,21-trihydroxy-16α-methyl-1,4-pregnadiene-3,20-dione 21-methanesulfonate and 20 ml. of acetonitrile. The mixture was heated under reflux for four hours and then evaporated under reduced pressure to a volume of 12 ml. This mixture was a concentrated solution of 9α-fluoro-11β,17α,21-trihydroxy-16α-methyl-1,4-pregnadiene-3,20-dione 21-phosphate triethylamine salt with some inorganic phosphate.

The mixture was cooled, 25 ml. of methanol added, and the cooled mixture treated with 33 ml. of 1.89 N methanolic sodium methoxide solution. The precipitated inorganic phosphates were removed by suction filtration and washed thoroughly with methanol. The combined filtrates were evaporated under reduced pressure to a volume of 12 ml. and treated with 30 ml. of methanol. The resulting cloudy solution was clarified by filtration through diatomaceous earth. The volume of the filtrate was brought to 40 ml. by the addition of methanol, and 120 ml. of ether was added with stirring. The precipitated product, which was 9α-fluoro-β11,17α,21-trihydroxy-16α-methyl-1,4-pregnadiene-3,20-dione 21-phosphate sodium salt, was collected by suction filtration, and washed with acetone and then with ether. The weight of the air-dried material was 3.06 g.

*Example 18*

A solution of bis-triethylamine phosphate was prepared by slowly adding 2.35 ml. of 85% phosphoric acid to 14.3 ml. of acetonitrile containing 9.9 ml. of triethylamine at 20° C. This solution was added to a stirred mixture of 5 g. of 9α-fluoro-11β,17α-dihydroxy-21-iodo-16α-methyl-1,4-pregnadiene-3,20-dione and 35 ml. of acetonitrile. The mixture was heated under reflux for six hours and then evaporated under reduced pressure to a volume of 12 ml. This filtrate contained a concentrated solution of 9αfluoro-11β,17α,21-trihydroxy-16α-methyl-1,4-pregnadiene-3,20-dione 21-phosphate triethylamine salt (9α-fluoro-16α-methylprednisolone 21-phosphate triethylamine salt), together with inorganic phosphates.

The concentrated solution was cooled, 25 ml. of methanol was added, and the cooled mixture treated with 33 ml. of 1.89 N methanolic sodium methoxide. The precipitated inorganic phosphates were removed by suction filtration and washed thoroughly with methanol. The combined filtrates were evaporated under reduced pressure to a volume of 12 ml., treated with 27 ml. of methanol and 500 mg. of decolorizing charcoal ("Nuchar C 1000 N") and clarified by suction filtration over a bed of "Cellite." The volume of the filtrate was brought to 40 ml. by the addition of methanol, and 120 ml. of ether was added with stirring. The precipitated product was collected by suction filtration and washed with acetone followed by ether, and air-dried.

Yield 3.81 g.

*Example 19*

A solution of bis-triethylamine phosphate was prepared by slowly adding 37.5 ml. of 85% phosphoric acid to 230 ml. of acetonitrile containing 160 ml. of triethylamine. The solution was added to a stirred mixture of 80 g. of 9α - fluoro - 11β,17α - dihydroxy - 21 - iodo - 16α - methyl - 1,4 - pregnadiene - 3,20 - dione, 939 g. of trisilver phosphate, and 576 ml. of acetonitrile. The mixture was boiled under reflux for six hours and then evaporated under reduced pressure to a volume of 180 ml. After the addition of 640 ml. of methanol, the silver-containing by-product was removed by suction filtration and washed with methanol. The combined filtrates were evaporated under reduced pressure to a volume of 210 ml., affording a concentrated solution of 9α - fluoro - 11β,17α,21 - trihydroxy - 1,4 - pregnadiene - 3,20 - dione 21-phosphate triethylamine salt.

The concentrated solution was diluted with 420 ml. of methanol, cooled to 10° C. and then treated with 530 ml. of 1.89 N methanolic sodium methoxide. The precipitated inorganic phosphates were removed by suction filtration and washed thoroughly with methanol. The combined filtrates were evaporated to a volume of 210 ml., treated with 30 ml. of methanol and 2.5 g. of decolorizing charcoal, and filtered through "Cellite." The filtrate was diluted to 656 ml. by the addition of methanol, and 1600 ml. of ether was added with stirring. The precipitated product which was 9α - fluoro - 11β,17α - dihydroxy - 16α - methyl - 21 - phosphoroyloxy - 1,4 - pregnadiene - 3,20 - dione monosodium salt was collected by suction filtration and washed first with acetone and then with ether, and air-dried.

Yield 56.7 g.

*Example 20*

The procedure of Example 17 is repeated, using 11β,17α - dihydroxy - 21 - iodo - 3,20 - pregnanedione as the starting material. The compound 11β,17α,21 - trihydroxy - 3,20 - pregnanedione 21 - phosphate triethylamine salt is formed in solution and converted without purification or recovery to the corresponding monosodium salt.

*Example 21*

The procedure of Example 17 is repeated, using 11β,17α - dihydroxy - 21 - iodo - 16α - methyl - 3,20 - pregnanedione as the starting material. The compound 11β,17α,21 - trihydroxy - 16α - methyl - 3,20 - pregnanedione 21 - phosphate triethylamine salt is formed in solution and converted without purification or recovery to the corresponding monosodium salt.

*Example 22*

The procedure of Example 17 is repeated, using 9α - fluoro - 11β,17α - dihydroxy - 21 - iodo - 16α - methyl - 3,20 - pregnanedione as the starting material. The compound 9α - fluoro - 11β,17α,21 - trihydroxy - 16α - methyl - 3,20 - pregnanedione 21 - phosphate triethylamine salt is formed in solution and converted without purification or recovery to the corresponding monosodium salt.

This application is a continuation-in-part of copending application of John M. Chemerda, Roger J. Tull, and James F. Fisher, Serial No. 697,513, filed November 20, 1957, now abandoned.

What is claimed is:

1. A process for producing tertiary lower alkyl amine salts of unsaturated pregnane-21-dihydrogen phosphate esters having a general formula of the group consisting of

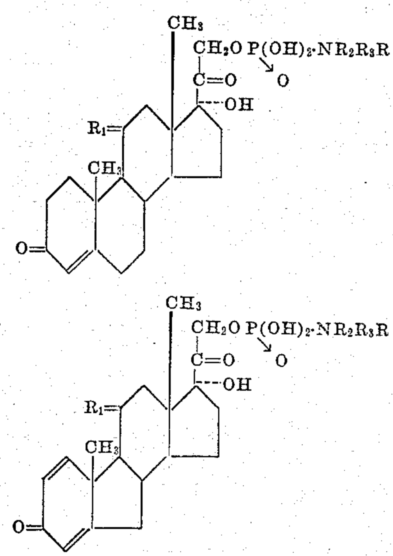

and the therapeutically active nuclear substituted derivatives thereof, where $R_1$ is selected from the group consisting of

HO
H and O= and $R_2$, $R_3$, and $R_4$ are lower alkyl radicals, which comprises combining a compound having a general formula of the group consisting of

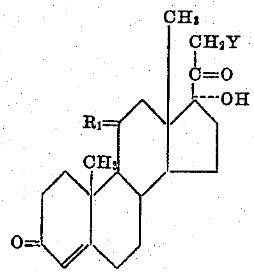

and

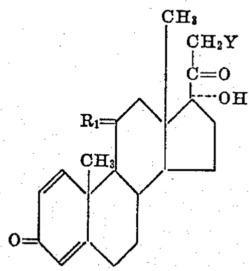

where $R_1$ is as previously defined and Y is a radical selected from the group consisting of halogens having an atomic weight of at least 35 and lower hydrocarbon sulfonyloxy radicals of the formula $—OSO_2R_5$ where $R_5$ is a hydrocarbon radical containing from one to 10 carbon atoms, with a tertiary lower alkyl amine phosphate in an alkaline organic solvent medium.

2. The process of claim 1, wherein the tertiary lower alkyl amine is triethylamine.

3. The process of claim 1, wherein the steroid starting material is a 4-pregnene having the general formula

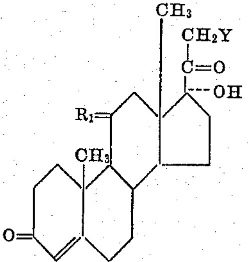

where $R_1$ is selected from the group consisting of

HO
H and O= and Y is a radical selected from the group consisting of chloro, bromo, iodo, methylsulfonyloxy, and p-tolylsulfonyloxy.

4. A process for preparing prednisolone-21-phosphate triethylamine salt, which comprises reacting 11β,17α-dihydroxy-21-iodo-1,4-pregnadiene-3,20-dione with triethylamine phosphate in an alkaline organic solvent medium.

5. A process for preparing 9α-fluoro-16α-methyl-prednisolone-21-phosphate triethylamine salt, which comprises reacting 9α-fluoro-11β,17α-dihydroxy-21-iodo-16α-methyl-1,4-pregnadiene-3,20-dione with triethylamine phosphate in an alkaline organic solvent medium.

6. A process for preparing 21-phosphate tertiary lower alkyl amine salts of compounds selected from the group consisting of 3,20-dioxo-11β,17α,21-trihydroxy and 3,11,20-trioxo-17α,21-dihydroxy steroids of the pregnane series, which comprises reacting a corresponding steroid selected from the group consisting of the 3,20-dioxo-11β, 17α-dihydroxy-21-halo and 3,11,20-trioxo-17α-hydroxy-21-halo steroids of the pregnane series wherein the halogen has an atomic weight of at least 35 and the 3,20-dioxo-11β,17α,21-trihydroxy and 3,11,20-trioxo-17α,21-dihydroxy 21-lower hydrocarbon sulfonates of the pregnane series wherein the hydrocarbon sulfonate radical contains from one to 10 carbon atoms, with a tertiary lower alkyl amine phosphate in an alkaline organic solvent medium.

References Cited in the file of this patent

UNITED STATES PATENTS

| | | |
|---|---|---|
| 2,779,775 | Sarett | Jan. 29, 1957 |
| 2,789,117 | Sarett | Apr. 16, 1957 |